United States Patent [19]

Okada et al.

[11] Patent Number: 5,121,252

[45] Date of Patent: Jun. 9, 1992

[54] PROJECTION SCREEN AND METHOD FOR PRODUCING THE SAME

[75] Inventors: Mizuo Okada, Yokohama; Kenichi Sakunaga; Shigetada Nakagawa, both of Toyama; Shozo Saito, Ageo, all of Japan

[73] Assignee: Mitsubishi Rayon Co., Ltd., Japan

[21] Appl. No.: 692,313

[22] Filed: Apr. 26, 1991

[30] Foreign Application Priority Data

May 11, 1990 [JP] Japan ................................. 2-120005
Jun. 1, 1990 [JP] Japan ................................. 2-143927
Jun. 4, 1990 [JP] Japan ................................. 2-245906

[51] Int. Cl.$^5$ ............................................. G03B 21/60
[52] U.S. Cl. ................................... 359/455; 359/456; 359/459
[58] Field of Search ............... 359/454, 455, 456, 459; 425/376.1, 378.1, 379.1, 404, 445, 463, DIG. 16; 428/294, 295

[56] References Cited

U.S. PATENT DOCUMENTS

| | | | |
|---|---|---|---|
| 3,561,840 | 2/1971 | Seki et al. | 350/128 |
| 4,006,965 | 2/1977 | Takada et al. | 350/117 |
| 4,682,853 | 7/1987 | Broer et al. | 350/128 |
| 4,688,093 | 8/1987 | van der Staak et al. | 350/128 |
| 4,767,186 | 8/1988 | Bradley, Jr. et al. | 350/128 |
| 4,911,529 | 3/1990 | Van De Ven | 350/127 |

*Primary Examiner*—Richard A. Wintercorn
*Attorney, Agent, or Firm*—Brumbaugh, Graves, Donohue & Raymond

[57] ABSTRACT

A projection screen is comprised of a sheet formed by a multiplicity of light-transmitting plastic strands which strands are arranged and welded in parallel with one another. The width W (mm) of the screen and the pitch p (mm) of the strands meet the following condition (1):

$$0.03 \leq p \leq W/1000 \quad (1)$$

The radius of curvature $R_1$ (mm) of the strand at a first side of the screen is determined by the following condition (2)

$$0.5 \cdot p \leq R_1 \leq p \quad (2)$$

The radius of curvature $R_2$ (mm) of the strand at a second side of the screen meets the following condition (3):

$$R_2 \leq R_1 \quad (3).$$

24 Claims, 14 Drawing Sheets

PROJECTION SCREEN AND METHOD FOR PRODUCING THE SAME

FIELD OF THE INVENTION

The present invention relates to a projection screen of a transmission type or reflection type which is used as a display screen such as a projection television screen or a micro-film reader screen.

BACKGROUND OF THE INVENTION

Projection screens of transmission type or reflection type are conventionally used for projecting television image or micro-film images. Usually, a projection screen has specific lens surfaces on its incident and/or viewing side in order to provide a brighter image and a greater viewing angle for the viewer of the screen. In particular, double-sided lenticular lenses are conventionally used for a projection screen. Commercially practical double-sided lenticular lenses are fabricated by various known methods such as extrusion, molding by a cell cast or heat-pressing. In these known methods, lenticular lenses are produced by transferring the pattern of a metal or resin mold directly or indirectly to a resin plate.

In a double-sided lens, the lenses on either side of the screen each has its own optical axis. The performance quality of the projection screen described above is seriously affected by any offset between these optical axes. Therefore, in the production of the projection screen it is essential that the optical axes of lenticular lenses on opposite sides of the screens are aligned with a high degree of precision. For instance, in the case of a projection screen having double-sided lenticular lenses with a lens pitch of approximately 1 mm, the tolerance of offset between the optical axes, as well as the variation in thickness, is as small as 2%, i.e., approximately 20 m$\mu$, in order to avoid degradation of color balance, restriction of the field of vision, color variation in the display frame, and so forth. Thus, the production of a projection screen having lenticular lenses on opposite sides essentially requires that the following conditions are met:

A: Molds for both sides of the lenticular lenses have a high degree of dimensional precision.

B: Mold temperature is uniform over the entire part of the mold so as to ensure uniform shrinkage of the mold during formation of the lenticular lenses as described above.

C: Both molds are precisely aligned with respect to each other to prevent loss of optical quality.

Conventional metals utilized for the production of lens molds have the following coefficient of thermal expansion values:

| steel: | $1.1 \times 10^{-5}$ 1/°C. |
| aluminum: | $1.7 \times 10^{-5}$ 1/°C. |
| brass: | $1.8 \times 10^{-5}$ 1/°C. |

Thus, steel, aluminum and brass exhibit a large thermal expansion or shrinkage of 11, 17 and 18 microns per meter of length in response to a 1° C. temperature change. Consequently, it becomes necessary to precisely manufacture the mold, to accurately control the molding and to precisely position the molds. As a practical matter, however, it is extremely difficult to control the dimensions of the molds and the mold temperature with a high degrees of precision. For these reasons, it has been difficult to form lenticular lenses on opposite sides of a screen with a high degree of alignment accuracy.

Recently, there has been an increasing demand for a quality lenticular lenses in order to meet the current demand for high resolution large-screen television displays. In the known methods described above, however, it is difficult to obtain high quality lenticular lenses with an acceptable small lens pitch offset between both sides of the projection screen when the screen is approximately 1 square meter or larger. Thus, it has been impossible to meet the demand for the high quality lenticular lenses.

Under these circumstances, a method has been proposed in which cylindrical columnar transparent members are arranged side-by-side to form a double-sided lenticular lens sheet having no offset of the lens pitch between both projection side and viewing side of the screen.

However, this method suffers from a problem in that lights leak through clearances between adjacent cylindrical columnar members so as to cause undesirable effects such as see-through or hot band on the screen.

In order to alleviate this problem, another method has also been proposed for producing a projection screen in which a multiplicity of plastic strands are melt-extruded and arranged such that adjacent strands are fused together at their sides. This method is disclosed, for example, in the specifications of the U.S. patent application No. 07/441,385, European Patent Application No. 89121877.8, and Taiwanese Patent Application Nos. 78/109315 and 89/17296. However, the projection screen of the present invention is not specifically disclosed in these patents.

Recently, a method was proposed in which lights of three primary colors are superimposed onto a projection screen so as to form a color display. In this method, the optical axis of one of the three primary colors is positioned at a right angle to the screen, while the optical axes of two other colors are inclined with respect to the plane normal to the plane of the screen. This often causes a local color imbalance on the screen. Projection screens for color display are required to have excellent optical performance so as to avoid problems such as the local color imbalance.

Thus, none of the proposed methods have yielded satisfactory results.

SUMMARY OF THE INVENTION

The present invention provide a projection screen in which the lenses on both sides of the screen are arranged with great precision, which does not have any gap between adjacent cylindrical columnar lens units at either side, and with which a color image can be displayed with a high degrees of resolution, brightness and uniformity. Thus, according to one aspect of the present invention, there is provided a projection screen comprising a sheet formed by a multiplicity of light-transmitting plastic strands which are arranged in parallel with one another, wherein the width W (mm) of the screen, the pitch p (mm) of the strands, the radius of curvature $R_1$ (mm) of each strand at a first side of the screen and the radius of curvature $R_2$ (mm) of each strand at a second side of the screen are determined to meet specific conditions.

In this projection screen the light-transmitting strands are advantageously arranged to reduce loss of light without forming any gap between adjacent strands in such a manner as to improve directivity of the light in the direction perpendicular to the longitudinal axes of the strands. This provides a projection screen of uniform optical characteristics which enables the display of images with high resolution and which provides a good balance of viewing angle between the horizontal and vertical directions.

In a preferred embodiment of the present invention, the strand surfaces are provided with minute convexities and concavities at least one side of the projection screen.

According to another aspect of the present invention, there are provided several improvements in producing a projection screen comprising a sheet composed of a multiplicity of parallel light-transmitting plastic strands having uniform optical characteristics which strands are arranged by extruding a thermoplastic polymer from a die or an orifice.

BRIEF DESCRIPTION OF THE DRAWINGS

FIGS. 21 to 24 illustrate a method of producing a projection screen, in which:

FIG. 21 is a plan view of an apparatus for extruding strands;

FIG. 22 is an illustration of an apparatus for taking up the strands;

FIG. 23 is a side view of the entire apparatus of FIGS. 21 and 22; and

FIG. 24 is a bottom plan view of the nozzle portion of the apparatus;

DESCRIPTION OF THE PREFERRED EMBODIMENTS

Figure 1:
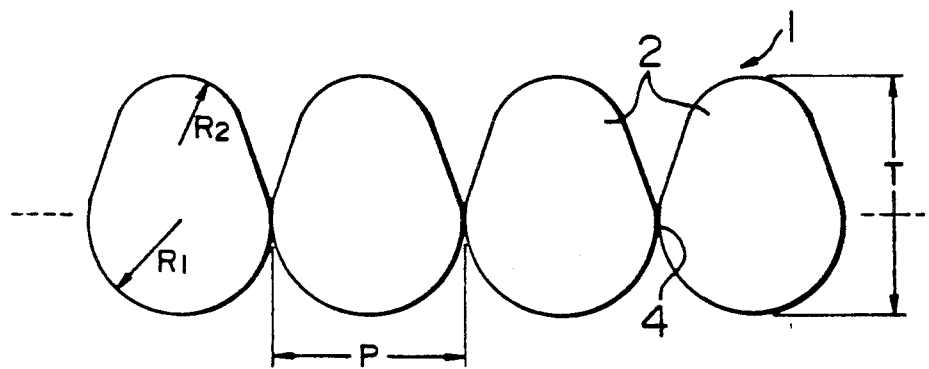
FIGS. 1 to 11 are cross-sectional views of various embodiments of the projection screen in accordance with the present invention.

The projection screen of the present invention comprises at least one sheet formed by a multiplicity of light-transmitting plastic strands which are arranged in parallel with one another. The width W (mm) of the screen and the pitch p (mm) of the strands meet the following condition (1):

$$0.03 < p < W/1000 \tag{1}$$

The strand is designed such that the radius of curvature $R_1$ (mm) of the strand at a first side of the screen meets the following condition (2):

$$0.5 \times p \leq R_1 \leq p \tag{2}$$

Furthermore, the strand is designed such that the radius of curvature $R_2$ (mm) of the strand at a second side of the screen meets the following condition (3):

$$R_2 \leq R_1 \tag{3}$$

Each of the strands forming the screen may have a light-transmitting main portion and a light-absorbing second portion, with the light-absorbing portion being formed on the flank of the strand at the second side.

Preferably, the light-absorbing portion is formed on both flanks of the strand.

The light-absorbing portions on both flanks of the respective strands may be formed such that the light-absorbing portions of adjacent strands are connected to each other.

In a preferred embodiment of the present invention, a light-absorbing layer is formed on both flanks of the strand on the second side of the screen. The light-absorbing layer may be disposed in a groove formed between adjacent strands at the second side of the screen. Preferably, the light-absorbing layer contributes to the bonding of the adjacent strands.

In another preferred embodiment of the screen in accordance with the present invention, minute protrusions and recesses are formed on the surface of the strands on at least one side of the screen. The fine protrusions and recesses may have the form of fly-eyes or the scores extending perpendicularly to the longitudinal axes of the strands on the surface of the screen.

These and other preferred embodiments of the present invention will be described in detail with reference to the accompanying drawings.

FIGS. 1 to 11 are schematic cross-sectional views of embodiments of the projection screen in accordance with the present invention.

Referring to these Figures, numeral 1 denotes a sheet formed from a multiplicity of light-transmitting plastic stands 2. The strands 2 extend in the direction perpendicular to the sheet of the drawing of FIGS. 1 to 11, i.e., in the vertical direction of the sheet, forming the projection screen. Each strand has constant cross-section over its entire length. The strand is made from a plastic having a high light transmittance, such as a thermoplastic polymer, e.g., an acrylic polymer, a polycarbonate or polyarylate, a cross-linked silicon polymer, a cross-linked arylate polymer, an ion cross-linked polymer or the like.

The strand 2 may not always be a colorless transparent one. Namely, the transparent strand may not always be a colorless transparent one. In particular, the transparent strand may be colored with a coloring agent dispersed therein or may be formed of a material containing a light-diffusing agent dispersed therein.

Each of the strand 2 has a convex surface at its upper and lower sides as shown in FIGS. 1 to 11. Adjacent strands 2 are bonded at their flank portions 4 so that a sheet is formed by a multiplicity of such strands.

The pitch at which the strands 2 are oriented is expressed by p, while the height of cross-section of the strand, i.e., the thickness of the screen, is represented by T. The convex surface at the lower, or first, side of cross-sectional view of the strand as illustrated in FIGS. 1 to 11, has a radius of curvature represented by $R_1$, while the convex surface at the upper, or second side of the screen, has a radius of curvature represented by $R_2$. In each of the projection screens of FIGS. 1 to 11, light enters the screen from the first side, i.e., from the lower side of the sheet as viewed in the Figures. The incident light is suitably condensed by the lower side (first side) of the strand and is transmitted to and then emitted from the upper side (second side) of the strand 2 which in the present embodiments is the viewing side.

In the projection screen of the present invention, the width W (mm) of the screen, i.e., the horizontal dimension of the screen as viewed in each of FIGS. 1 to 11, and the pitch p (mm) of the strands meet the following condition (1):

$$0.03 \leq p \leq W/1000 \tag{1}$$

In addition, the radius of curvature $R_1$ (mm) of the strand at the first side of the screen meets the following condition (2):

$$0.5 \times p \leq R_1 \leq p \tag{2}$$

Furthermore, the strand is designed such that the radius of curvature $R_2$ (mm) of the strand at the second side of the screen is determined to meet the following formula (3):

$$R_2 \leq R_1 \tag{3}$$

The reason why the condition of formula (1) is to be met is as follows:

In general, the resolution limit of the human eye at the distance of its most distinctive vision is approximately 0.06 mm where the viewing angle is one minute. Thus, assuming that two strands provide one line pair, the pitch p of the strand needs not be reduced down below 0.03 mm. Namely, a finer pitch does not distinguishable to the human eye but raises the production cost. In ordinary projection televisions of NTSC type, the horizontal resolution is 500 to 600 in terms of TV lines, or pixel lines. The number (N) of TV lines which can be put on display is generally said to be 0.5 to 0.8 times as large the line pair number n, that is, $N = n \times (0.5 \sim 0.8)$, although there are many proposals as to a preferred relationship between the number of TV lines and the number of line pairs. Thus it was determined that the number of the line pairs, i.e., the number of the lenticules, necessary for displaying 500 to 600 TV lines is about 1000 at the smallest.

The reason why the condition of the formula (2) should be met is as follows.

The radius $R_1$ is a factor which primarily has the effect of spreading light in the lateral, i.e., horizontal, direction of the screen. Assuming that the strand has a simple circular cross-section, the minimum value of the radius $R_1$ is expressed by $0.5 \times p$. It has been determined that this dimensional relationship is also applicable when the cross-section of the strand is not completely circular but approximates a circle. When the value of the radius of curvature $R_1$ is greater than p, lateral diffusion of the light is reduced so that a projection screen of a low production cost can be obtained without employing a lenticular surface. This is obtained by using an efficient body diffuser wherein a light diffusing agent is dispersed in the screen material or by using a surface diffuser which is formed by roughing the screen surface in a random manner. However, in order to attain a better light diffusion characteristic than that offered by the body diffuser or the surface diffuser, the radius of curvature $R_1$ of the present invention is not greater than p.

The reason why the condition of the formula (3) is to be met is as follows.

In order to assure that a good display is exhibited within a suitable angular region, including the direction normal to the plane of the screen, the radius of curvature $R_2$ should not exceed $R_1$.

The projection screens shown in FIGS. 1 to 11 meet all three conditions of the formulae (1) to (3).

Figure 2:
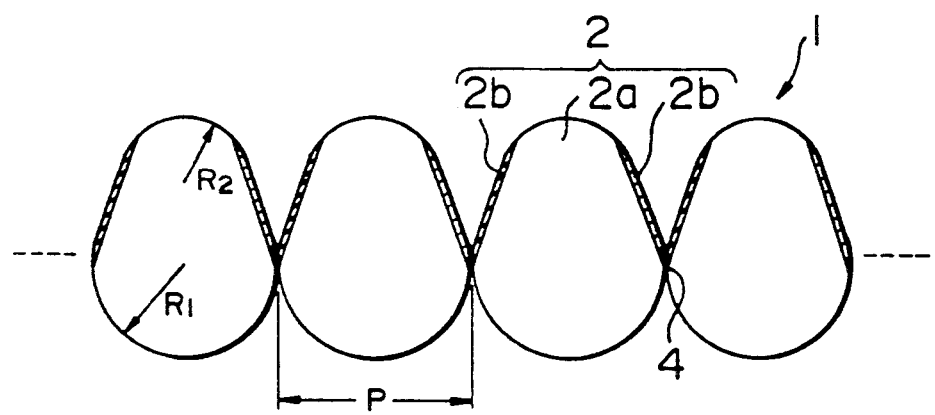

In the projection screen shown in FIG. 2, each strand 2 has a light-transmitting main portion 2a and light-absorbing portions 2b which are provided on both flanks of the strand 2 facing the upper side of the screen, i.e., on the viewing or second side of the screen and which extend along the length of the strand, i.e., in the plane normal to the cross-sectional view of FIG. 2.

The light-transmitting main portion 2a may be produced from any one of the strand materials mentioned before.

The light-absorbing portion 2b may be formed from a mixture of a light absorbent material, i.e. black pigment such as carbon black, mixed with the same material as the main portion 2a.

In the embodiment shown in FIG. 2, a high image contrast may be obtained on the screen even when the screen is placed in a bright environment, because unnecessary extrinsic lights is absorbed by the light-absorbing portions 2b provided on the viewer's side.

Furthermore, since the light-absorbing portion 2b can be formed down to a bottom portion, for example, in the valley between the strands 2, it is possible to absorb the light which tends to impinge upon neighboring strand interfaces between strands, for example, thus suppressing flaring. This ensures sharp contrast in the display image. In addition, since the light-absorbing layer can have a sufficiently large thickness, it is possible to obtain a display image having any desired density of the color black.

The light-transmitting main portion 2a may be colorless or colored by dispersion of a suitable coloring agent therein. It is also possible to form the main portion from a material containing a light diffusing agent.

Figure 3:
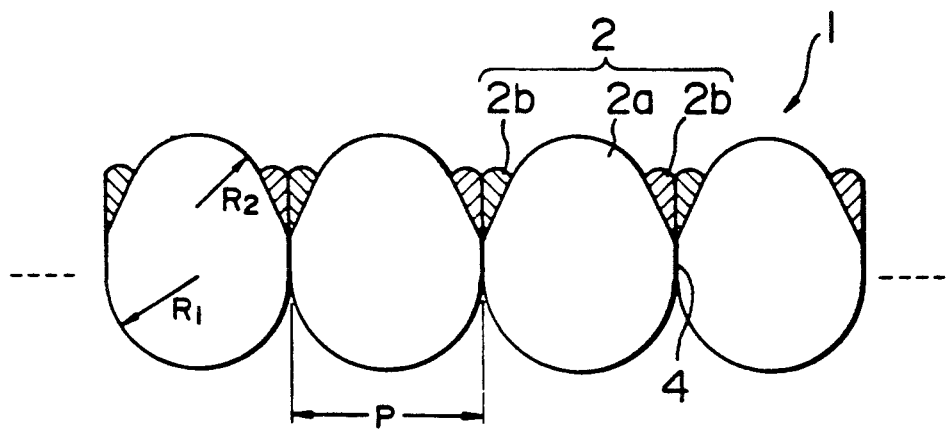

FIG. 3 shows a projection screen in which each strand has light-absorbing portions 2b of a different configuration from that employed in the projection screen shown in FIG. 2. In the projection screen of FIG. 3, adjacent strands 2 are bonded not only at the main portions 2a but also at the light-absorbing portions 2b so as to form an integral sheet. In accordance with this arrangement, the cross-section of the strand 2 is less susceptible to physical pressure and, in addition, greater bonding strength is obtained by virtue of the increased bonding area.

Figure 4:
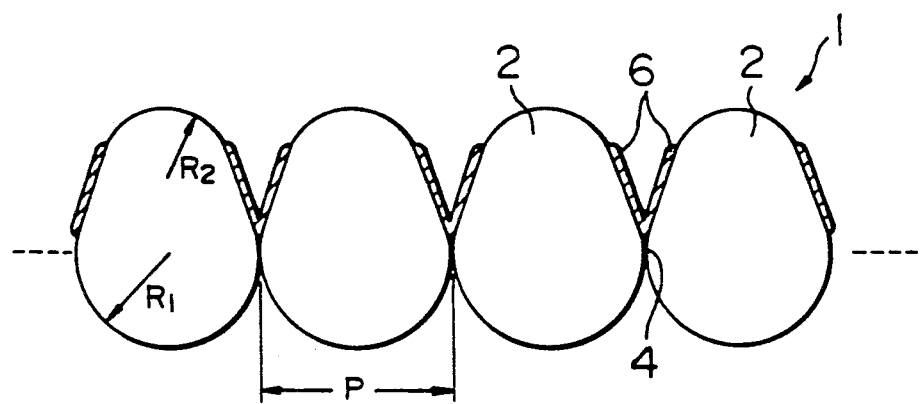

FIG. 4 shows a projection screen in which each strand 2 is provided with light-absorbing layers 6 which are formed on both flank portions of each strand at the upper side, i.e., the viewing side, of the screen. In contrast to the embodiment of FIG. 2, wherein the light-absorbing layer is formed using a mixture of a light-absorbent material, the light-absorbing layer 6 of FIG. 6 may be formed by applying a paint containing a light-absorbing agent such as carbon black.

Figure 5:
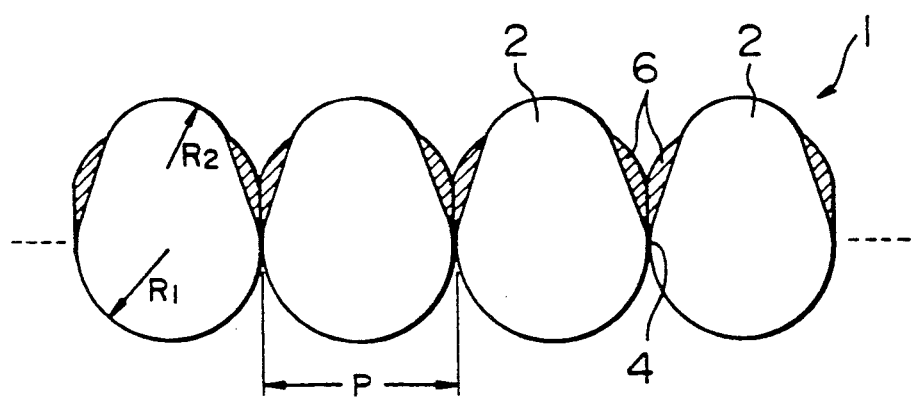

FIG. 5 shows a projection screen which is substantially the same as that shown in FIG. 4 except that the light-absorbing layers 6 have a greater thickness than in the screen of FIG. 4.

Figure 6:
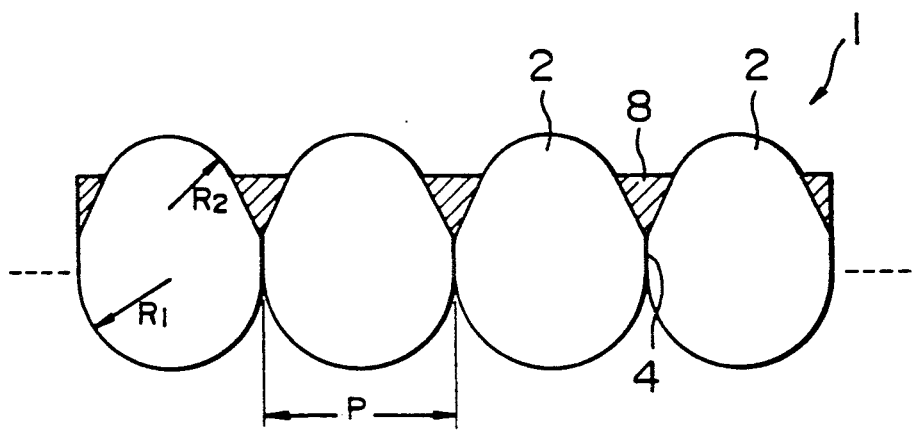

FIG. 6 shows a projection screen in which light-absorbing members 8 are provided on both flank portions of the strand 2 at the upper side, i.e., viewing side of the screen.

The light-absorbing member 8 is preferably comprises a material which is prepared by dispersion of a light-absorbing agent such as a black pigment, e.g., carbon black, in the same polymer as that used for the main portion 2a of the strand 2 (see FIG. 2). The light-absorbing member 8 may be formed by applying a paint of the above-mentioned material or may be formed as an independent strand which is then bonded to the flanks of the each adjacent strands. Thus, the light-absorbing member 8 contributes to the bonding of the adjacent strands 2.

Figure 7:
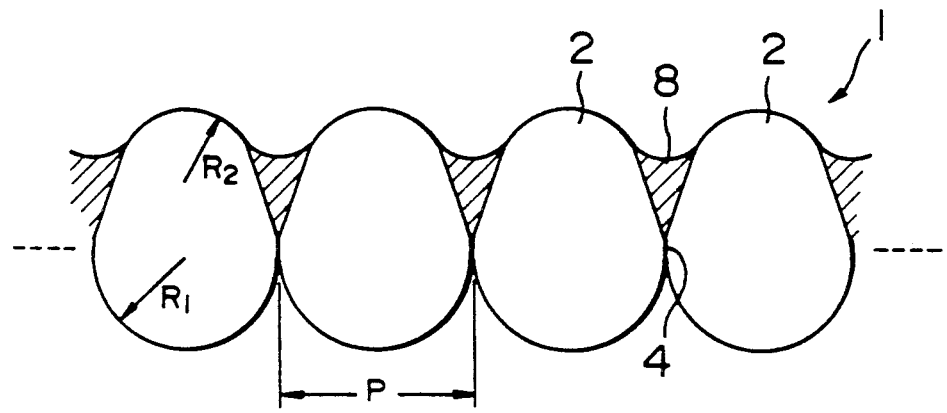
Figure 8:
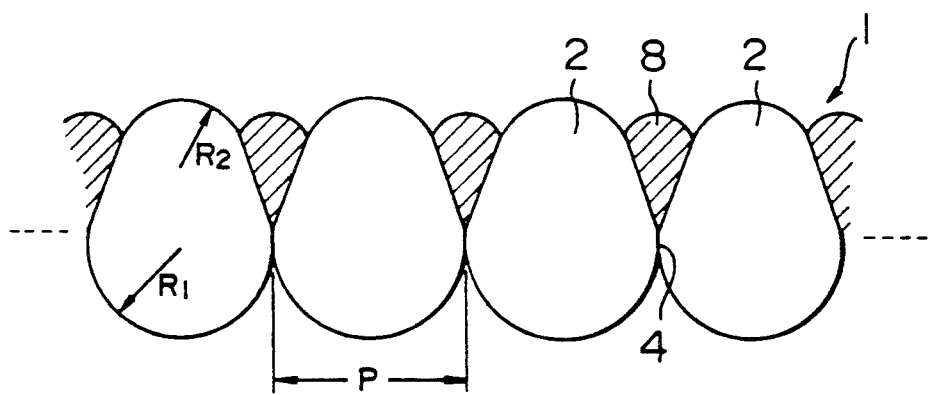

FIGS. 7 and 8 illustrate projection screens which are similar to that shown in FIG. 6 but employ different cross-sectional shapes of the light-absorbing member 8.

Figure 9:
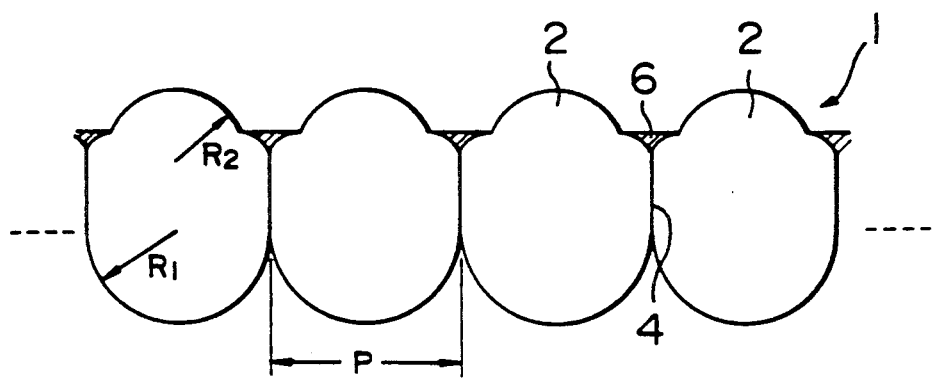
Figure 10:
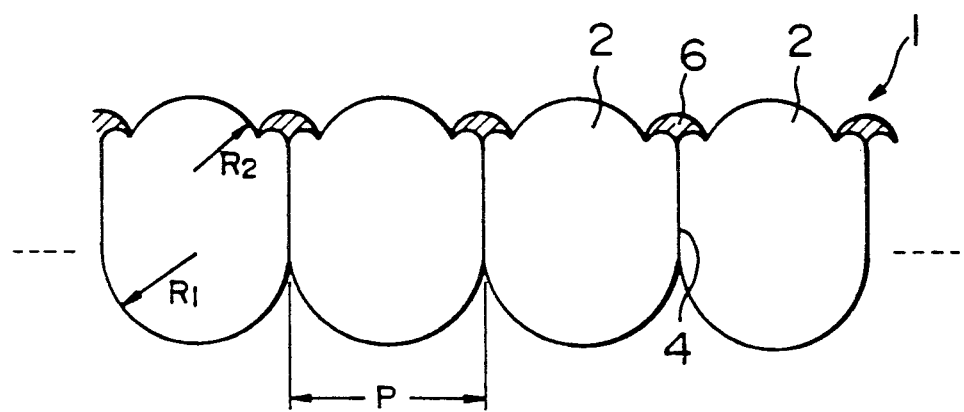

FIGS. 9 and 10 illustrate projection screens which are substantially the same as those shown in FIGS. 1 to 8, but employ different cross-sectional shapes of the light-transmitting strand 2.

In the projection screens shown in FIGS. 9 and 10, a greater bonding strength is obtained due to a large area of bonding between adjacent strands 2.

Figure 11:
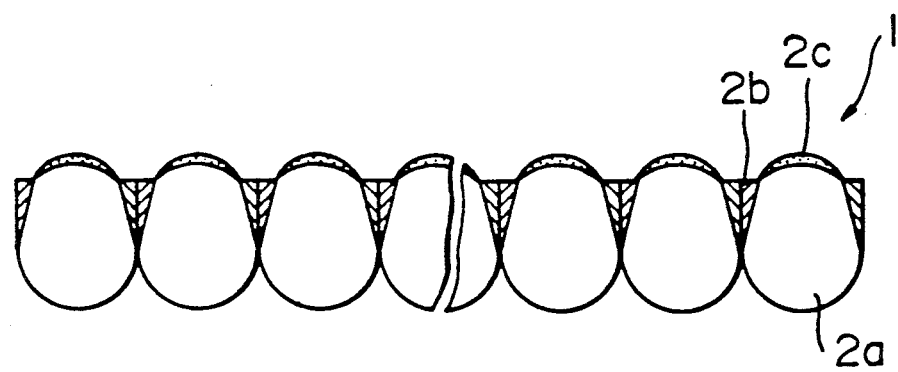
Figure 12:
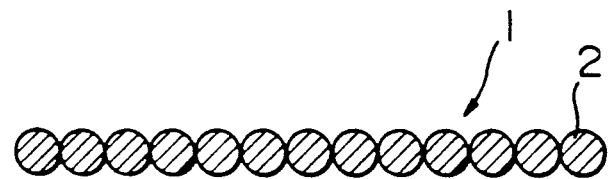
FIGS. 12 to 15 are cross-sectional views of other different embodiments of the projection screen in accordance with the present invention, in which minute protrusions and recesses (not shown) are formed on one side of the screen.
Figure 13:
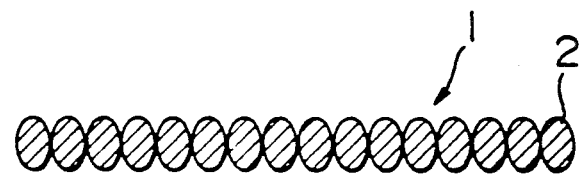

FIG. 11 illustrates an embodiment of the projection screen of the present invention having in addition to light transmitting and absorbing portions 2a and 2b, respectively, a third auxiliary portion 2c.

The auxiliary portion 2c of FIG. 11 exhibits differing optical characteristics from the light transmitting main portion of the projection screen. For example, the auxiliary portion may exhibit light dispersal or diffusing characteristics. In addition, the auxiliary portion may have a refractive index which is different from that of the light transmitting main portion.

The projection screens shown in FIGS. 1 to 11 can be formed by preparing a melt of a light-transmitting thermoplastic polymer mentioned above, or by preparing melts of polymeric materials forming each portion of the strand, extruding the melt(s) from a nozzle or die having orifices the number and cross-sectional shapes of which are determined to provide the desired size and shape of the strands, so as to form a sheet, and then cooling the extruded sheet. This principle is applied also to the production of other types of the projection screens of the present invention.

Figure 14:
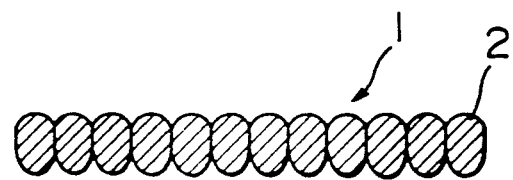
Figure 15:
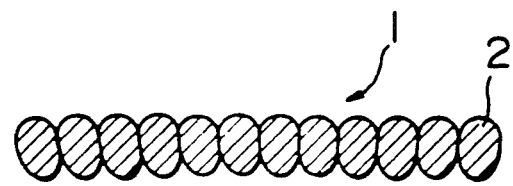

FIGS. 12 to 16 illustrate projection screens of the present invention having minute protrusions and recesses (not shown) formed on the surface of the second side of the screen. The projection screen has a multiplicity of light-transmitting plastic strands 2 which are bonded side-by-side to form a sheet. In the projection screen shown in FIG. 12, each plastic strand has a circular cross-section, while in FIG. 13 the strand 2 has an elliptic cross-sectional shape. The projection screen shown in FIG. 14 is formed from strands 2 having an egg-shaped cross-section. FIG. 15 illustrates a projection screen in which a multiplicity of light-transmitting strands 2, each having an egg-shaped cross-section, are arranged at such inclinations that the optical axes of the outer strands form angles to the line normal to the plane of the sheet, thus creating a directivity towards the center. The outer surfaces of the successive adjacent strands 2 are fused and welded together so as to form an integral sheet which serves as the projection screen.

Figure 16:
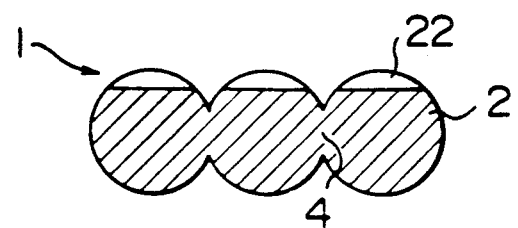
FIG. 16 is a partial enlarged sectional view of a projection screen with minute protrusions and recesses (not shown) formed on one side thereof.

The projection screen shown in FIGS. 12 to 16 are roughened at one side of the screen so as to present minute protrusions and recesses. This is illustrated by FIG. 16, in which minute protrusions and recesses have been formed on the portion 22 in the upper surface of individual strands 2. The roughened surface of the portion 22 diffuses the transmitted light in the direction perpendicular to the axis of the light-transmitting strand 2, generally in the vertical direction, thus improving the directivity of the display light.

The projection screens shown in FIGS. 12 to 16 can be formed by extruding a thermoplastic polymer from a nozzle or die so as to form a sheet composed of a multiplicity of light-transmitting plastic strands bonded together, pressing the sheet at a temperature higher than the thermal deformation temperature of the strand against the surface having minute convexities and concavities, and then cooling the sheet.

The projection screens may also be formed by a process having the steps of preparing a first melt of a mixture of a thermoplastic polymer for a main portion of the strand and dispersing therein particles of a polymer which exhibits different melting/cooling behaviors from that of the thermoplastic polymer for the main portion, extruding both the melt and another melt of the polymer for the main portion from a nozzle or a die so as to form a sheet composed of a multiplicity of parallel light-transmitting plastic strands provided with auxiliary portion on the crest portion of the strand, and then cooling the sheet.

FIGS. 17 to 20 illustrate other types of the projection screens which are prepared by the steps of extruding a thermoplastic polymer from a nozzle having orifices which are arranged in a ring-like formation so as to form a sheet composed of a multiplicity of parallel light-transmitting plastic strands arranged on a curved plane, flattening the curved sheet thus obtained into a planar form, and then cooling the flattened sheet.

Each orifice may have a circular or non-circular cross-sectional shape.

In addition, the nozzle may have secondary orifices which are arranged between main orifices for extruding the light-transmitting main portion 2a or whole plastic strand 2 wherein the secondary orifices have a diameter smaller than that of the main orifices, the secondary orifices being used for extruding the light-absorbing layers.

Figure 17:
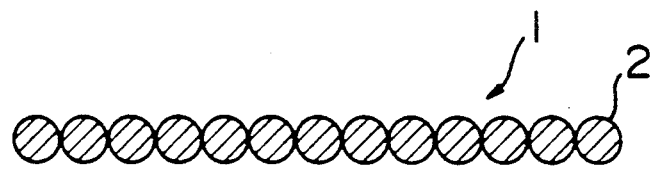
FIGS. 17 to 20 are cross-sectional views of various embodiments of the projection screen which are devoid of minute protrusions and recesses.
Figure 18:
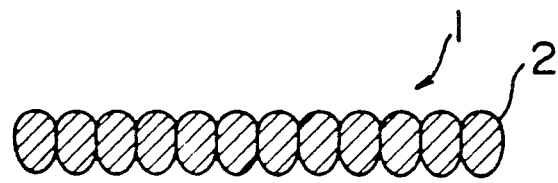
Figure 19:
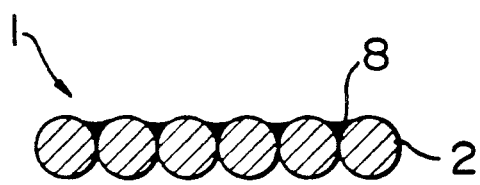
Figure 20:
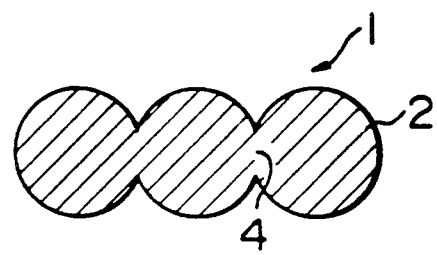

In these Figures, reference numeral 2 denotes light-transmitting plastic strands. More specifically, FIG. 17 illustrates a projection screen in which each strand 2 has a circular cross-sectional shape, FIG. 18 illustrates a projection screen in which each strand has an egg-like cross-sectional shape and FIG. 19 illustrates a projection screen in which an external-light absorbing layer is formed between adjacent strands. In each of these projection screens, adjacent light-transmitting strands 2 are welded at their flank (side) portions 4 as shown in FIG. 20 so as to form a sheet 1 which is used as a transmission-type projection screen. The external-light absorbing layer is denoted by a numeral 8.

Figure 21:
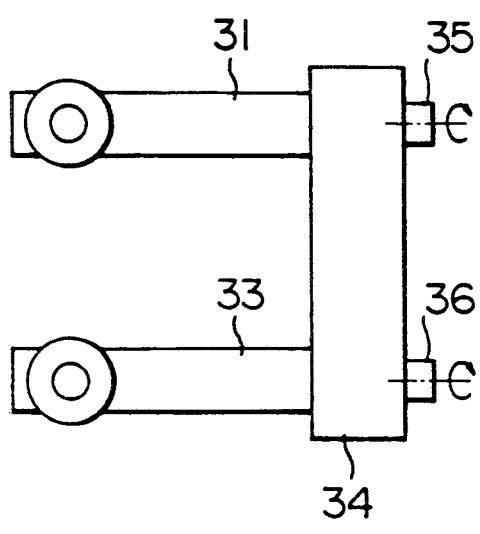
Figure 22:
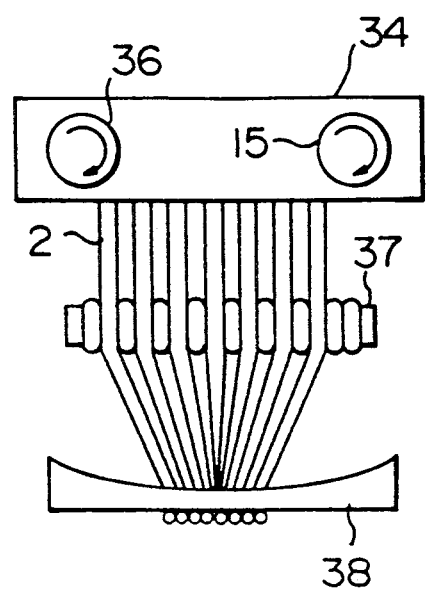
Figure 23:
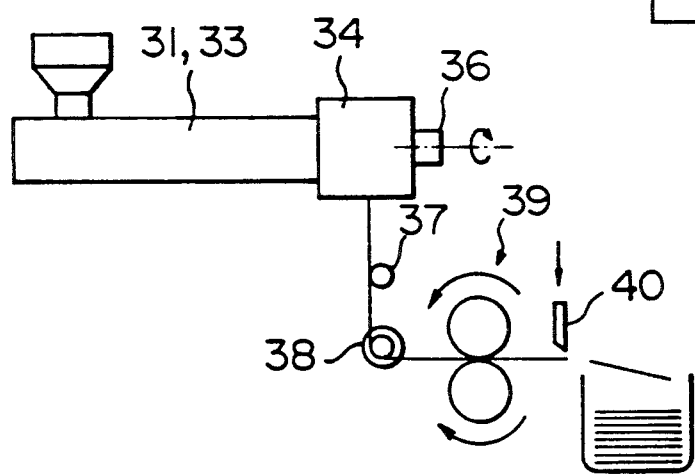
Figure 24:
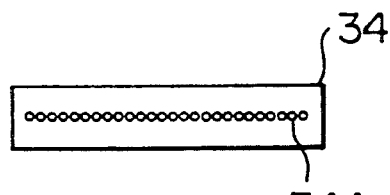
Figure 25:
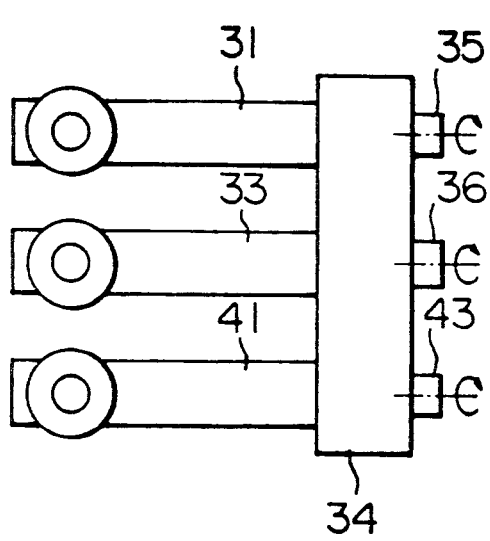
FIGS. 25 to 28 illustrate another production method of the invention, with descriptions corresponding to FIGS. 21 to 24, respectively.
Figure 26:
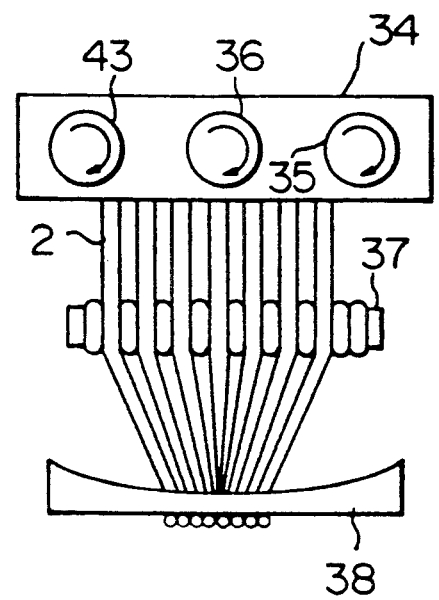
Figure 27:
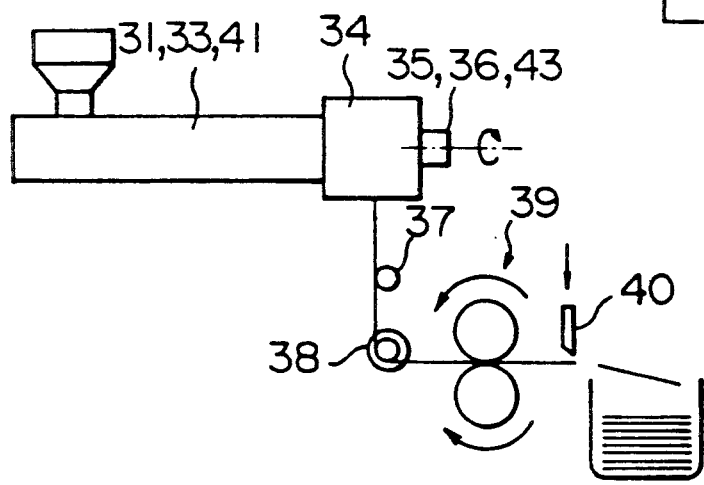

FIGS. 21 to 24 are illustrations of an embodiment of the method of the present invention for producing a projection screen. More specifically, FIG. 21 is a schematic plan view of an extrusion apparatus, FIG. 22 is a schematic front view of the extrusion apparatus showing mainly a portion for taking up the strand. FIG. 23 is a schematic side view of the entire apparatus, and FIG. 24 is a schematic bottom plan view of a nozzle.

Referring to these Figures, numeral 31 denotes a first extruder for extruding the main portion 2a of the strands 2, while 33 denotes a second extruder for extruding the material for forming the light absorbing portion 2b. Numeral 34 designates a die having orifices 34A through which two types of molten plastics are extruded. The opening of each orifice 34A has the cross-section of a strand 2 including the light-absorbing portion. Numerals 35 and 36 denote constant-discharge-rate pumps which are used for independently controlling the rates of supply of the melts to the die 34.

The strands 2 formed from the two types of molten plastics discharged by the above-described conjugate extrusion method are aligned by a grooved aligning guide 37 which is disposed immediately under the die. The strands 2 are then passed through a bonding guide 38 which is recessed at its central portion, whereby the adjacent strands are bonded together at their main portions 2a and light-absorbing portions 2b, whereby the extruded strands are integrated into a sheet which is usable as a transmission type projection screen. Numeral 39 denotes a nip roller for taking up the sheet, while 40 designates a cutter which cuts the continuous sheet into segments of a suitable length.

FIGS. 25 to 28 illustrate a method for producing a projection screen of the type shown in FIG. 11 in which each strand 2 has a light-transmitting main portion 2a, light-absorbing portions 2b and an auxiliary portion 2c. This method is materially the same as that explained in conjunction with FIGS. 21 to 24, except that an extruder 41 and a constant-discharge-rate pump 43 are used additionally for extruding the material of the auxiliary portion 2c.

Figure 29:
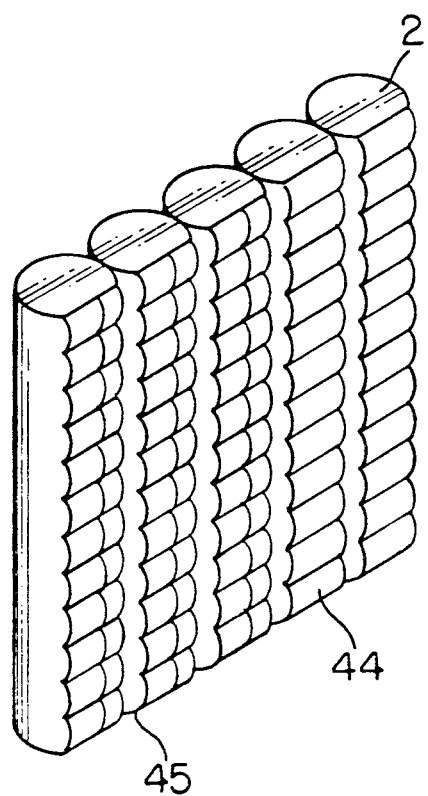
FIG. 29 is an enlarged perspective view of an embodiment of the projection screen in accordance with the present invention, having minute protrusions and recesses.

FIG. 29 shows an embodiment of the projection screen of the present invention in which fine convexities and concavities 44 in the form of fly-eyes are formed on the viewing side of the projection screen so as to extend in a direction perpendicular to the axis of the light-transmitting strands 2. Numeral 45 denotes an external light absorbing layer formed between adjacent light-transmitting strands 2.

Figure 30:
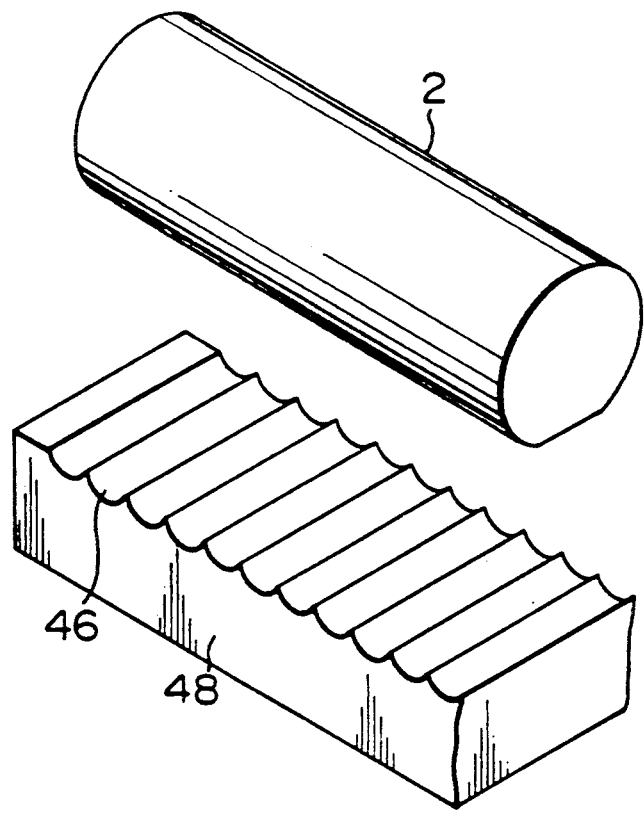
FIGS. 30 and 31 are schematic perspective views of a method for forming minute protrusions and recesses on a surface of a screen.

This projection screen may be produced by pressing a sheet of the strands to a mold having a configuration complementary (reverse) to the form of the convexities and concavities at an elevated temperature. An example of such a mold is shown in FIG. 30. In FIG. 30, only one strand 2 is shown for the purpose of clarification of the drawings. The mold denoted by 48, made of brass or similar material, has a multiplicity of circular recesses 46 complementary (reverse) to the concavities and convexities on which the light-transmitting strand 2 is placed and a mirror plate such as a stainless steel plate is placed on the strand 2 and the thus-formed assembly is placed between upper and lower hot dies of a heat-press apparatus, whereby the projection screen shown in FIG. 29 is obtained by a heat press work.

As to the dimensions of the fine convexities and concavities, the pitch and depth of the grooves of the mold 48 are determined to be about 60 μm and 20 μm, respectively, when the diameter of the light-transmitting strand 2 is approximately 0.25 mm. However, these values are only illustrative and different dimensions are intended to be within the scope of the invention. When an acrylic resin is used, the temperature of the hot dies of the hot press is preferably set to be around 180° C.

Figure 31:
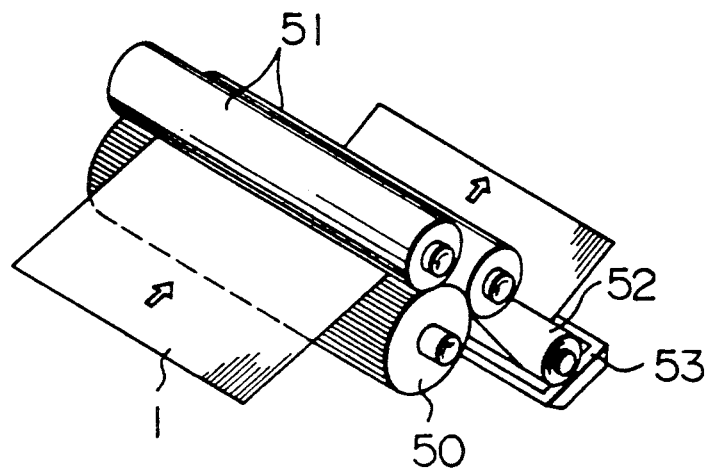
Figure 32:
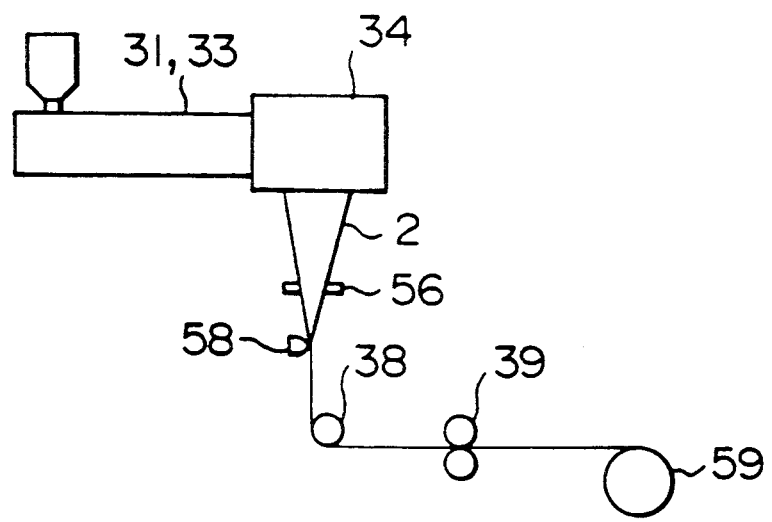
FIG. 32 is a schematic side view of an apparatus used in the production of a projection screen of the present invention.

The formation of fine convexities and concavities by a heat-press can be conducted continuously. FIG. 31 shows an apparatus suitable for use in such a continuous formation of fine convexities and concavities. Namely, a sheet 1 of light-transmitting strands 2 is supplied to a heated patterning roller 50 and is pressed onto the roller 50 by means of a pair of rubber rollers 51 so that the pattern of convexities and concavities is transferred to the surface of the sheet 1. The sheet 1 is then made to pass on the surface of a quench roller 52 and pass through a cooling bath 53.

This continuous patterning method may be conducted in the course of formation of a sheet of light-transmitting strands, before the extruded light-transmitting strands are cooled to form an integral sheet.

The two methods of forming convexities and concavities described above are only illustrative and various other methods may be used for forming convexities and concavities. For instance, the convexities and concavities may be formed in the course of extrusion and cooling of the light-transmitting strands. More specifically, this can be done by mixing, in a thermoplastic polymer for the light-transmitting strand or its main portion, a polymer which exhibits different melting/cooling behaviors from that of the main polymer, melting the mixture, extruding both the mixture and another melt of the main polymer together to form strands, so that the mixture is projected or recessed from the surface of the strands after cooling them. For instance, when the material of the light-transmitting strands is an acrylic resin, styrene beads having a mean particle size of 10 μm are preferably mixed with the acrylic resin and the mixture is used as the auxiliary material. With the use of such an auxiliary material, it is possible to obtain a satin-like minute convexities and concavities on the strand surfaces.

As described above, the projection screens illustrated in FIGS. 17 to 20 were produced by a melt-extrusion process which can be described with reference to FIGS. 32 to 36. In these Figures, numerals 31 and 33 denote extruders and 34 denotes a nozzle having orifices through which one or more kinds of molten thermoplastic polymers are extruded. As will be seen from FIG. 33, the orifices 34A of the nozzle 34 are arranged in a ring-like form. The use of nozzle having such annular arrangement of orifices offers an advantage in that, since the nozzle is generally heated by external heat source, a uniform temperature distribution is developed over all orifices so as to eliminate any local spinning fluctuation, thus ensuring uniform spinning of all strands without any twist. In order to stabilize the extrusion rate, it is possible to use a constant-discharge-rate pump. As will be understood, only one kind of melt is extruded from the orifices for preparing the projection screen shown in FIGS. 17 and 18.

The light-transmitting strands 2 discharged from the extruder nozzle 34 are passed through a ring guide 56 which is disposed immediately under the nozzle so that the strands 2 are welded together to form a sheet as the strands move along the inner surface of the ring guide 56. The sheet in circular form thus prepared is then transformed into a linear or flat sheet by an "iron" type guide 58 and a straight guide 38. The sheet is then taken-up by nip rollers 39 and wound on a roller 59.

Figure 33:
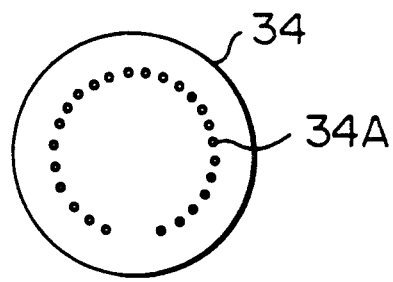
FIG. 33 is a bottom plan view of a nozzle incorporated in the apparatus of FIG. 32.
Figure 34A:
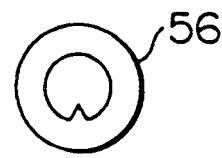
FIGS. 34A and 34B are a plan view and a sectional view of a ring guide. respectively.
Figure 34B:
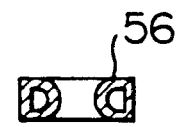
Figure 35A:
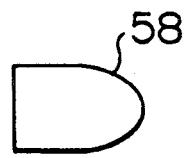
FIGS. 35A and 35B are a plan view and a sectional view of an "iron" type guide, respectively.
Figure 35B:

In the above-described embodiment which employs a nozzle 34 shown in FIG. 33, the light-transmitting strands 2 are extruded as independent strands and are then bonded together to form a sheet. This embodiment, however, is only illustrative and the strands may alternatively be formed with a nozzle having orifices which have independent openings but are arranged in such a way that the streams of the polymer melt merge together at a point immediately downstream of the nozzle outlet, so that the strands are integrated to form a sheet immediately after the discharge from the nozzle. The nozzle shown in FIG. 36 has two types of orifices: orifices 34A for extruding a resin material for forming the light-transmitting main portion of the strands and orifices 34B for extruding a polymer for forming the light-absorbing portion.

As explained in the foregoing, the projection screen according to the present invention can be produced by using an ordinary melt-extrusion process. However, it is possible to use a conjugate extrusion process as required.

Although the light-transmitting strands 2 are formed from a single polymer material in the described embodiment, this is only illustrative and the invention does not extrude formation of core-sheath type strands by using different types of polymers. It is also possible to form external light absorbing portions simultaneously with the light-transmitting main portions by conjugate melt-extrusion method.

The cross-sectional size of the light-transmitting strand is suitably determined in accordance with the size and purpose of use of the projection screen. Generally, however, the cross-sectional size of the light-transmitting strand ranges substantially between 0.1 and 1.5 mm in diameter, thus contributing to the realization of fine pitch of display on the screen.

The projection screen of the present invention is preferably formed from a single sheet comprised of a multiplicity of strands. The projection screen, however, may also be formed from a plurality of sheets which may be bonded by a bond or adhesive or otherwise mechanically attached so as to form a wider projection screen as explained above when the size of the apparatus is limited.

The precision of pitch of the strands can be remarkably improved as compared with the case where independent strands are merely arranged side-by-side even when the projection screen of the present invention is formed from a plurality of sheets connected together.

A description of the optical characteristics of the projection screen will now be given.

Figure 37:
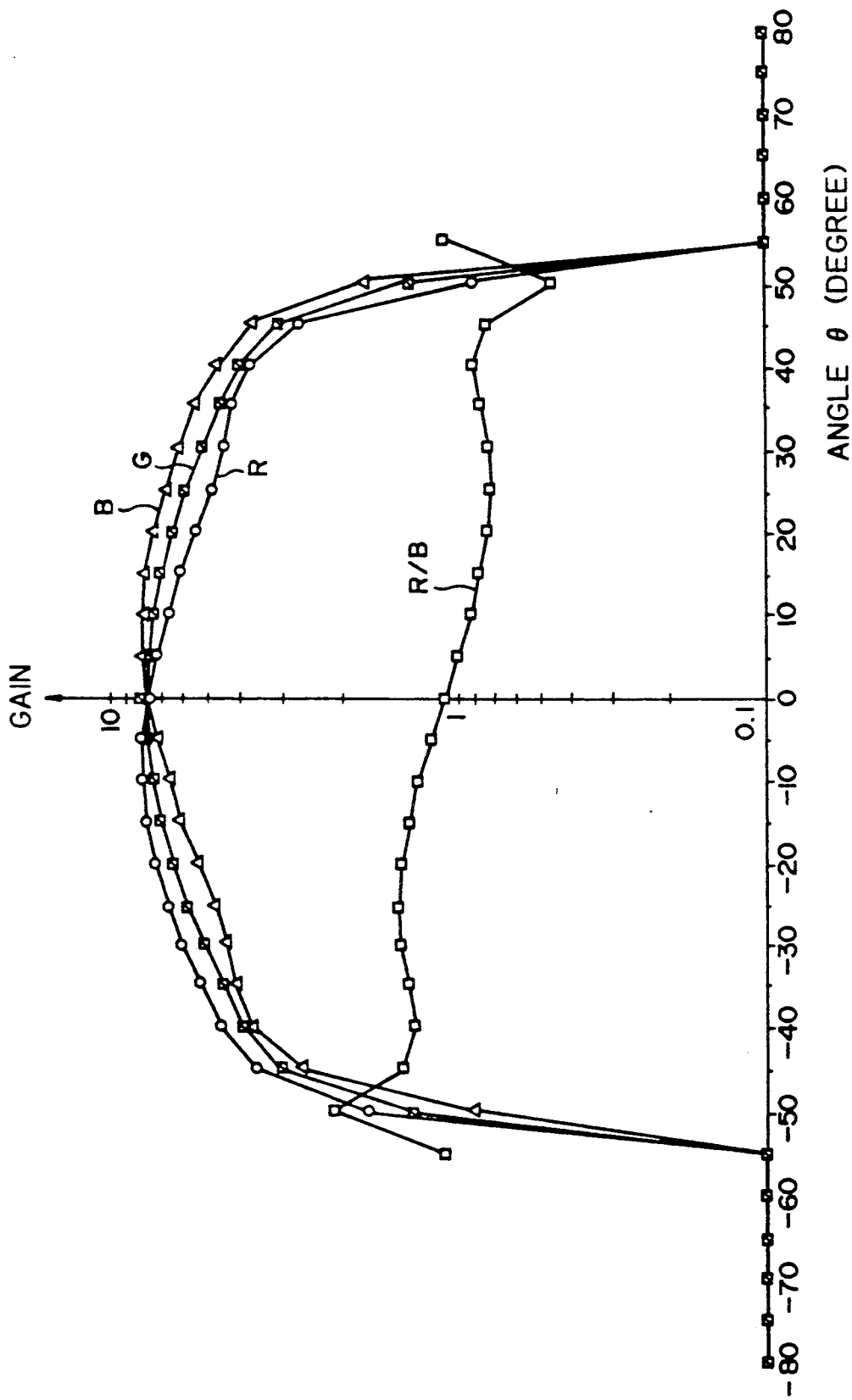
FIG. 37 is a graph showing characteristics of a projection screen in accordance with the present invention.

FIG. 37 is a graph showing the result of calculations of characteristics of the projection screen shown in FIG. 1. In this case, the strand 2 is made from an acrylic polymer. The refractive index (Nd) of this polymer is assumed to be 1.49. The width W (mm) of the screen at the time of use is 970 mm, while the pitch p at which the strands are arranged is 0.2 mm. The radii $R_1$ and $R_2$ of the strands are 0.1 mm and 0.08 mm, respectively. The thickness T of the screen is 0.24 mm. Thus, the projection screen of FIG. 1 is designed and constructed to meet the requirements of the formulae (1) to (3).

In FIG. 37, a curve G shows the angular distribution of the light-transmission gain of the light which impinges upon the screen, normal thereto, while curves B and R respectively represent the light-transmission gain obtained when the lights are projected to the screen in directions which are inclined 8° in both directions from the direction normal to the screen. The curve R/B shows the ratio between the light-transmission gains. The measurement of the lights G, B and R was conducted with a Gonio photometer (automatic variable-angle photometer) Model GP-1 produced by Murakami Shikisai Gijutsu Kenkyu-sho Kabushiki Kaisha. The above-mentioned inclination angle 8° is adopted for the following reasons.

Figure 38:
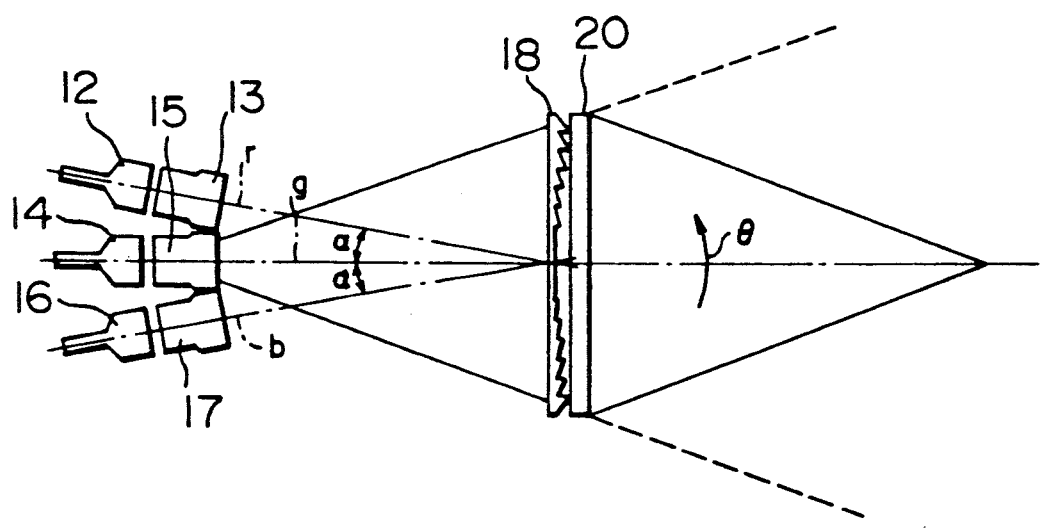
FIG. 38 is a schematic illustration of an optical system used in a projection color television.

FIG. 38 is a schematic illustration of optical system incorporated in a projection color television. Numerals 12, 14, and 16 respectively denote cathode ray tubes (CRTs, for red (R), green (G) and blue (B) colors), while numerals 13, 15 and 17 are projecting lenses attached to the red, green and blue CRTs 12, 14, and 16. Numeral 18 designates a circular Fresnel lens, while 20 designates a lenticular lens which forms a projection screen of the present invention. The lenticular lens has a multiplicity of lens units which extend in the direction perpendicular to the plane of sheet of the drawings. As shown in the drawings, the optical axis g of the green color CRT 14 and the associated projection lens 15 is perpendicular to the above-mentioned Fresnel lens 18 and the lenticular lens 20. On the other hand, the optical axis r of the red-color CRT 12 and the associated projection lens 13 and the optical axis b of the blue color CRT 16 and the associated projection lens 17 are inclined at angle $\alpha$ in both directions from the optical axis g mentioned above. The three optical axis r, g and b intersect one another at a point on the screen which is composed of the Fresnel lens 18 and the lenticular lens 20.

The angle $\alpha$ is usually about 8°. The color balance and the overall uniformity of the optical characteristic of the projection screen (lenticular lens) can be evaluated by measuring the optical characteristics of the projection screen in response to a light projected to the lenticular lens at a right angle to the same and lights which are incident to the same at about 8° inclinations in both directions from the direction normal to the plane of the lenticular lens.

As will be seen from FIG. 37, the projection screen of the present invention provides a sufficiently high gain at the angle $\theta$ ranging between $-50°$ and $+50°$. In addition, the difference in the gains between the colors G, B, and R is small so that the ratio R/B which is an indicative of the color balance does not fluctuate substantially when the angle $\theta$ falls within the range mentioned above. It is therefore understood that the projection screen of the present invention provides superior color display characteristic.

The present invention will now be further described specifically with reference to the following Examples. It should be understood, however, that the invention is not limited to the specific details set forth in the Examples.

EXAMPLE 1

A projection screen of the type shown in FIG. 11 was produced by using the apparatus shown in FIGS. 25 to 28. A polymethylmethacrylate having a refractive index n of 1.49 was used as the material of the light-transmitting main portions of the strands. A material prepared by mixing silica particles as light diffusing agent in the above-mentioned polymethylmethacrylate was used as the material of the auxiliary portion. A material formed by mixing carbon black as light-absorbing agent in the above-mentioned polymethylmethacrylate was used as the material of the light-absorbing portion.

Figure 28:
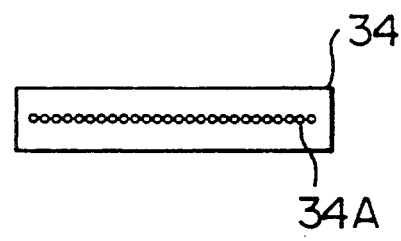

Using a nozzle 34 having 500 orifices 34A arranged as shown in FIG. 28, a conjugate melt-spinning process was executed at an extrusion temperature of 240° C., while supplying the main portion material at a rate of 0.6 g/orifice·min, the auxiliary portion material at a rate of 0.2 g/orifice·min and the light-absorbing portion material at a rate of 0.2 g/orifice·min, such that 500 strands were discharged simultaneously. The discharged strands were passed through an aligning guide 37 and a welding guide 38 so as to be integrated to form a sheet. The sheet was taken-up by nip rollers 39 at a rate of 6.74 m/min.

The distance between the nozzle 34 and the aligning guide 37 was set at 150 mm. The aligning guide was forced to be cooled so as to maintain a constant temperature at the surface thereof.

In the sheet thus obtained, the strands 2 were arranged uniformly and linearly at a pitch of 0.4 mm. The width of the sheet thus obtained was 20 cm. Five pieces of this sheet, each having a length of 1 m, were connected side by side with an adhesive tape to form a projection screen of 1 m long and 1 m wide.

The projection screen was tested on a projection television. An image of high degrees of resolution and contrast, with a wide viewing angle, were confirmed.

EXAMPLE 2

A double-sided lenticular sheets for a 45-inch projection television, having a cross-section as shown in FIG. 8, was formed by a conjugate extrusion process.

In this Example, a polymethylmethacrylate, containing 2 wt % of styrene polymer beads of a mean particle size of 10 $\mu$m added as a light diffusing agent, was used as the material of the light-transmitting main portion which is denoted by 2 in FIG. 6.

A polymethylmethacrylate containing 5 wt % of carbon black was used as the material of the light-absorbing portion denoted by 8 in FIG. 6. Extrusion and take-up of the strands were conducted by an apparatus which is similar to that shown in FIGS. 21 to 23 but is devoid of the cutter. A nozzle of the type shown in FIG. 24, with 3776 orifices, was used in the apparatus.

The rate of extrusion of the material for the light-transmitting main portion per was 0.3 g/orifice—min, while the extrusion rate of the material for the light-absorbing portion per orifice was 0.05 g/orifice·min. The extrusion was conducted at a die temperature of 250° C.

The dimensions of the strands of this sheet, when reference is made to FIGS. 1 and 8, were as follows.

$p = 0.25$ mm (250 $\mu$m)
$T = 0.3$ mm
$R_1 = 0.125$ mm
$R_{22} = 0.1$ mm

The screen of a 45-inch television is 914 mm wide and 686 mm high. On the other hand, the sheet produced by this Example had a width of 944 mm (0.25 mm × 3776) and a height of 716 mm. The peripheral margin portion of 15 mm wide of the produced screen was used as the screen mounting portion.

The lenticular lens sheet was placed on the viewer's side and a Fresnel lens sheet was placed behind the lenticular lens sheet, i.e., on the projection side of the lenticular lens sheet. The Fresnel lens had a focal distance of 1.1 mm, Fresnel lens pitch of 0.1 mm, a width of 944 mm and a height of 716 mm. The lenticular lens sheet and the Fresnel lens as a unit were mounted on the projection TV for an evaluation of quality of the image. A bright image with good color tones and contrast was confirmed not only when viewed in a direction perpendicular to the plane of the lenticular lens sheet but also when the image was viewed in a direction inclined to the plane of the lenticular lens sheet.

EXAMPLE 3

A projection screen having a fly-eye type fine convexities and concavities as shown in FIG. 29 was produced. This projection screen was formed by the following method. A polymethylmethacrylate, containing 1 wt % of styrene polymer beads of 10 $\mu$m in mean particle size added as a light-diffusion agent, was extruded from a nozzle at an extrusion temperature of 260° C. The discharged strands were passed through an aligning guide which is disposed immediately below the nozzle and adapted for aligning the strands and then through a welding guide for welding the strands together, whereby a sheet composed of parallel strands welded side-by-side was obtained. The nozzle used had 1000 orifices. Each strand had a circular cross-section of about 0.3 mm in diameter.

While the sheet was still hot (about 130° C.), a fly-eye type minute convexities and concavities were imparted to the surfaces of the strands by using an apparatus of the type shown in FIG. 31. The apparatus incorporated a patterning roller 50 having parallel recesses or grooves shown in a greater scale in lower part of FIG. 30. The hot sheet was pressed twice against the patterning roller 50 by a pressing roller 51 having a flat surface.

The sheet after this surface processing was directly introduced into a water bath 53 so as to be cooled.

The grooves in the patterning roller 50 were formed at a pitch of 60 $\mu$m to have a constant depth of 20 $\mu$m. During the formation of the fly-eye pattern, the patterning roller was maintained at an elevated temperature of 180° C.

The strands in the sheet were slightly pulled after the extrusion so that their diameter was slightly reduced. In the final product sheet, the diameter of the strands was 250 $\mu$m. As a consequence, the sheet width was 250 mm.

The sheet was cut into segments of 1 m long as measured in the direction of axes of the strands, and four such segment sheets were arranged on the viewing side of the Fresnel lens of 1 m wide and 1 m height such that the fly-eye pattern faces the viewer. The segment sheets were adhered at their upper and lower ends to the Fresnel lens so that a screen with a Fresnel lens sheet and a lenticular lens sheet integrated together was obtained.

The Fresnel lens had a focal distance of 1.5 m and a lens pitch of 0.1 mm.

An image on a 35 mm color slide film was projected by a projector to the rear side of the screen for evaluation of the display performance. A bright image of good quality with uniform color tone could be observed.

EXAMPLE 4

A projection screen substantially the same as that shown in FIG. 19 was produced by using an apparatus of the type shown in FIGS. 32 and 34A to 36.

Figure 36:
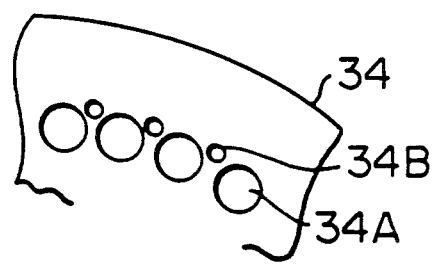
FIG. 36 is a bottom plan view of a portion of a nozzle used in the production of a projection screen of the present invention.

The extrusion was conducted by using a nozzle of the type shown in FIG. 36 having 200 orifices 34A for extrusion of a light-transmitting main portion arranged in a ring form and the same number of smaller orifices 34B for extruding a light-absorbing portion material arranged between adjacent orifice 34A. A melt of a polymethylmethacrylate was supplied to the orifices 34A at a rate of 0.3 g/orifice·min. while a melt of polymethylmethacrylate containing 5 wt % of carbon black was supplied to the orifices 34B at a rate of 0.05 g/hole·min. The extrusion was conducted at a die temperature of 250° C.

The strands were taken up at a rate of 2.4 m/min and were welded with a ring guide to form a sheet and the sheet was opened to flat form with an "iron" type guide and a straight guide. All these guides were cooled by water of 20° C. circulated therethrough.

The sheet thus obtained had a multiplicity of light-transmitting strands of 0.4 mm diameter arranged in parallel with one another, with the external light absorbing layer formed between each pair of adjacent strands, the number of strands being 200.

Figure 39:
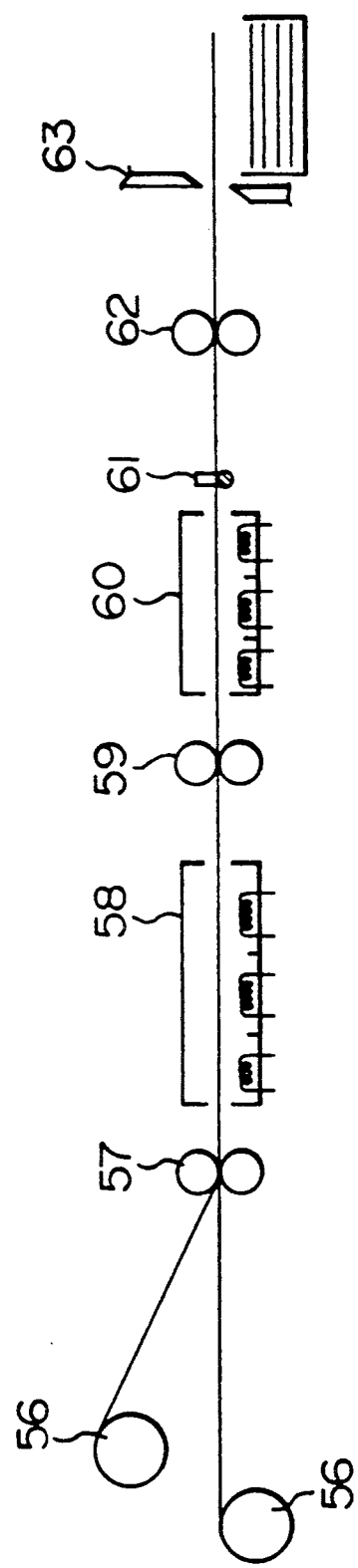
FIG. 39 is a schematic side view of an apparatus. for bonding two or more sheets, used in an embodiment of the present invention.

The sheet was then bonded with other sheets to form a sheet of greater width by the apparatus shown in FIG. 39, thus forming a transmission-type projection screen. More specifically, 20 sheets were unwound by first nip rollers 57 from rollers 56 (only 2 of the rollers are shown in FIG. 39) set on roller stands and were passed through a first far-infrared heater 58 for straightening through elimination of winding tendency. The sheets were then pulled by second nip rollers 59 and were passed through a second far-infrared heater 60 so as to be heated. The sheets were then passed through a bending guide 61 having a form of a curved bar such that these sheets were brought together and welded to one another. The welded sheet was then pulled by third nip rollers 62 at a speed of 2 m/min and was finally cut into sheet segments of 1 m long by a cutter 63. The atmosphere in the first far-infrared heater was maintained at 140° C. so that the sheet was drawn at a ratio of 1.5 during passing through this heater. The temperature of the atmosphere maintained in the second far-infrared heater was 160° C. and the sheets were drawn at a ratio of 1.1 during passing through this heater.

The projection screen thus obtained was tested on a color projection television. A clear image with good color tone and contrast was observed not only in the direction perpendicular to the projection sheet but in directions which are inclined to the plane normal to the projection screen.

What is claimed is:

1. A projection screen comprising a sheet formed by a multiplicity of light-transmitting plastic strands arranged in parallel with one another, wherein the width W (mm) of the screen and the pitch p (mm) of the strands meet the following condition (1):

$$0.03 \leq p \leq W/1000 \tag{1}$$

the radius of curvature $R_1$ (mm) of each strand at a first side of the screen meets the following condition (2):

$$0.5 \times p \leq R_1 \leq p \tag{2}$$

and the radius of curvature $R_2$ (mm) of each strand at a second side of the screen meets the following condition (3):

$$R_2 \leq R_1 \tag{3}$$

2. A projection screen according to claim 1, wherein the screen comprises more than one of said sheets.

3. A projection screen according to claim 1, wherein each said strand has a light-transmitting main portion and at least one light-absorbing portion which is located on a flank of said strands at a second side of said projection screen.

4. A projection screen according to claim 3, wherein said light-absorbing portions are formed on both sides of the flank of said strands.

5. A projection screen according to claim 3, wherein said light-absorbing portions of adjacent strands are bonded to each other.

6. A projection screen according to claim 1, wherein at least one light-absorbing layer is fixedly attached to a flank of said strand at the second side of said projection screen.

7. A projection screen according to claim 1, wherein a light-absorbing substance is disposed in a groove formed by flanks of adjacent strands at the second side of said projection screen and wherein said light-absorbing substance extends along the length of said strands.

8. A projection screen according to claim 7, wherein said light-absorbing substance contributes to the bonding of said adjacent strands.

9. A projection screen according to claim 1, wherein the surface of said strand is provided with minute convexities and concavities on at least one of said first or second sides of said projection screen.

10. A projection screen according to claim 9, wherein said minute convexities and concavities present a fly-eye type pattern.

11. A projection screen according to claim 9, wherein said minute concavities and convexities present scores which extend perpendicularly to the longitudinal axes of said strands.

12. A projection screen according to claim 1, wherein each said strand has a light-transmitting main portion and an auxiliary portion, said auxiliary portion being located at the crest of each of said strands on a second side of said projection screen and wherein said auxiliary portion has different optical characteristics from those of said light-transmitting main portion.

13. A projection screen according to claim 12, wherein said auxiliary portion has a light-diffusing characteristics.

14. A projection screen according to claim 12, wherein said auxiliary portion has a refractive index which is different from that of said light-transmitting main portion.

15. A projection screen according to claim 1 wherein said strands have a coloring agent dispersed therein.

16. A projection screen according to claim 3 wherein said at least one light-absorbing portion is formed integral in said strands.

17. A projection screen according to claim 3 wherein said light-absorbing portion is formed of a mixture comprising light-absorbing pigment with the same material used for forming said light-transmitting portion.

18. A method of producing a projection screen comprising a multiplicity of light-transmitting plastic strands arranged in parallel with one another, the surface of said strand being provided with minute convexities and concavities formed thereon at least one side of said projection screen, said method comprising the steps of: melt-extruding a thermoplastic polymer from a nozzle or a die so as to form a sheet composed of a multiplicity of parallel light-transmitting plastic strands; pressing said sheet to the surface of a patterning member having fine concavities and convexities formed thereon at a temperature not lower than the thermal deformation temperature of said thermoplastic polymer; and cooling said sheet.

19. A method of producing projection screen comprising a multiplicity of light-transmitting parallel plastic strands, the surface of said strand being provided with minute convexities and concavities formed thereon at least one side of said projection screen, said method comprising the steps of: preparing a mixture of a first thermoplastic polymer and particles of a second thermoplastic polymer having different melting/cooling characteristics than said first thermo-plastic polymer, said mixture being used to form an auxiliary portion of said strands; melt-extruding both of the first thermoplastic polymer used to form a light-transmitting main portion of said strands and said mixture from a nozzle or a die having a multiplicity of orifices so as to form a sheet composed of a multiplicity of parallel light-transmitting plastic strands wherein said auxiliary portion has different optical properties than said light-transmitting portion; and cooling said sheet.

20. A method of producing a projection screen comprising a multiplicity of light-transmitting plastic strands, comprising the steps of: extruding a thermoplastic polymer from a nozzle having a multiplicity of annularly arranged orifices so as to form a sheet composed of a multiplicity of parallel light-transmitting plastic strands arranged along a curve corresponding to the annular pattern of said multiplicity of orifices; flattening the curved sheet; and cooling the flattened sheet.

21. A method of producing a projection screen according to one of claims 18, 19 and 20, wherein the width W (mm) of said screen and the pitch p (mm) of the strands meet the following condition (1):

$$0.03 \leq p \leq W/1000 \tag{1}$$

the radius of curvature $R_1$ (mm) of each of the strands at a first side of the screen meets the following condition (2):

$$0.5 \times p \leq R_1 \leq p \tag{2}$$

and the radius of curvature $R_2$ (mm) of each of the strands at a second side of the screen meets the following condition (3):

$$R_2 \leq R_1 \tag{3}$$

22. A method of producing a projection screen according to one of claims 18, 19 and 20, wherein a plurality of said sheets are connected in the widthwise direction so as to provide a projection screen of a desired width.

23. A method of producing a projection screen according to claim 20, wherein each of said multiplicity of orifices of said nozzle has an outlet opening of a circular cross-section.

24. A method of producing a projection screen according to claim 20, wherein said nozzle has main orifices for extruding a thermoplastic polymer to form a light-transmitting main portion of each of said strands and secondary orifices having smaller diameter than the main orifices for extruding a light-absorbing portion or layer, said secondary orifices being arranged between said main orifices.

* * * * *